US009112298B1

(12) United States Patent
Hayden et al.

(10) Patent No.: US 9,112,298 B1
(45) Date of Patent: Aug. 18, 2015

(54) APPARATUS FOR PROVIDING UTILITY RECEPTACLES AND CABLES AT A SELECTED LOCATION ON A WORKSTATION

(71) Applicant: Premier Manufacturing Group, Inc., Shelton, CT (US)

(72) Inventors: Russ Hayden, Stratford, CT (US); Michael Brandstatter, Ansonia, CT (US); David Black, Orange, CT (US); Michael O'Keefe, Wethersfield, CT (US); Kimberly Golden, Wallingford, CT (US); Ryan O'Connor, Seymour, CT (US); Paul Murphy, Hamden, CT (US); Andrew Grandin, Stamford, CT (US); Glenn Golden, Wallingford, CT (US); Kevin P. Richard, Shelton, CT (US)

(73) Assignee: Premier Manufacturing Group, Inc., Shelton, CT (US)

( * ) Notice: Subject to any disclaimer, the term of this patent is extended or adjusted under 35 U.S.C. 154(b) by 0 days.

(21) Appl. No.: 14/299,450

(22) Filed: Jun. 9, 2014

Related U.S. Application Data

(60) Provisional application No. 61/832,929, filed on Jun. 9, 2013, provisional application No. 61/833,127, filed on Jun. 10, 2013.

(51) Int. Cl.
*H01R 13/60* (2006.01)
*H01R 13/52* (2006.01)
*H01R 13/514* (2006.01)

(52) U.S. Cl.
CPC .......... *H01R 13/5213* (2013.01); *H01R 13/514* (2013.01)

(58) Field of Classification Search
CPC .................. A47B 21/06; A47B 2200/0082
USPC ....................... 439/528; 108/50.02; 312/223.6
See application file for complete search history.

(56) References Cited

U.S. PATENT DOCUMENTS

| 5,071,204 | A * | 12/1991 | Price et al. .................... 312/194 |
| 6,327,983 | B1 * | 12/2001 | Cronk et al. ................ 108/50.02 |
| 2005/0268823 | A1 * | 12/2005 | Bakker et al. .............. 108/50.02 |

*Primary Examiner* — Tho D Ta
(74) *Attorney, Agent, or Firm* — Raymond A. Nuzzo

(57) ABSTRACT

The present invention is directed to an apparatus for providing utility receptacles and cables at a selected location on a work station that has a work surface. The apparatus comprises a housing comprising a lower portion and an upper portion. The upper portion has a perimeter and a flange portion that extends about the entire perimeter. The upper portion of the housing has a top opening that is bounded by the flange portion. The lower portion of the housing comprises lengthwise and widthwise walls that are attached to and extend downwardly from the upper portion of the housing. The housing further comprises a bottom panel that is attached to the lengthwise and widthwise walls. The housing has an interior region that is accessible through top opening. The housing is sized so that the lower portion of the housing fits into a through-hole in a work surface of a work station and the flange portion contacts and rests upon the portion of the work surface that extends about the through-hole in the work surface. The apparatus further comprises a receptacle support structure located within the interior region and attached to the lower portion of the housing at a predetermined location above the bottom panel so as to form a lower compartment beneath the receptacle support structure. The receptacle support structure is generally centrally located within the interior region and further includes an interior. The receptacle support structure further includes a plurality of through-holes therein that lead to the lower compartment. A plurality of utility receptacles are attached or mounted to the receptacle support structure. The plurality of utility receptacles comprises AC power receptacles, telephone jacks and USB device charging ports. A HDMI signal switching device is located within the lower compartment and comprises a plurality of HDMI input connectors and a HDMI output connector. The apparatus further comprises a plurality of HDMI cables. Each cable extends from a corresponding opening in the receptacle support structure and has a first HDMI connector connected to a corresponding HDMI input connector of the HDMI signal switching device and second HDMI connector for connection to an external source device. The apparatus further comprises a HDMI output connector attached to the bottom panel of the housing and connected to the HDMI output connector of the HDMI signal switching device.

9 Claims, 22 Drawing Sheets

APPARATUS FOR PROVIDING UTILITY RECEPTACLES AND CABLES AT A SELECTED LOCATION ON A WORKSTATION

CROSS-REFERENCE TO RELATED APPLICATIONS

This application claims the benefit of the filing date of U.S. provisional application No. 61/832,929 filed Jun. 9, 2013.

This application also claims the benefit of the filing date of U.S. provisional patent application No. 61/833,127, filed Jun. 10, 2013. The entire disclosure of U.S. application No. 61/833,127 is hereby incorporated by reference.

BACKGROUND OF THE INVENTION

1. Field of the Invention

The present invention generally relates to an apparatus for providing utility receptacles and cables at a selected location on a workstation or article of furniture, such as a table, desk, workbench or other surface.

2. Description of Related Art

Devices for distributing and providing utility receptacles at selected locations on a workstation or article of furniture are known in the art. Typical prior art devices are described in U.S. Pat. Nos. 5,230,552 and 5,709,156.

SUMMARY

The present invention is directed to an apparatus for providing utility receptacles and cables at a selected location on a work station that has a work surface. The apparatus comprises a housing which comprises a lower portion and an upper portion. The upper portion has a perimeter and a flange portion that extends about the entire perimeter. The upper portion of the housing has a top opening that is bounded by the flange portion. The lower portion of the housing comprises lengthwise and widthwise walls that are attached to and extend downwardly from the upper portion of the housing. The housing further comprises a bottom panel that is attached to the lengthwise and widthwise walls. The housing has an interior region that is accessible through top opening. The housing is sized so that the lower portion of the housing fits into a through-hole in a work surface of a work station and the flange portion contacts and rests upon the portion of the work surface that extends about the through-hole in the work surface. The apparatus further comprises a receptacle support structure located within the interior region and attached to the lower portion of the housing at a predetermined location above the bottom panel so as to form a lower compartment beneath the receptacle support structure. The receptacle support structure is generally centrally located within the interior region and further includes an interior. The receptacle support structure further includes a plurality of through-holes therein that lead to the lower compartment. A plurality of utility receptacles are attached or mounted to the receptacle support structure. The plurality of utility receptacles comprises AC power receptacles, telephone jacks and USB device charging ports. A HDMI signal switching device is located within the lower compartment and comprises a plurality of HDMI input connectors and a HDMI output connector. The apparatus further comprises a plurality of HDMI cables. Each cable extends from a corresponding through-hole in the receptacle support structure and has a first HDMI connector connected to a corresponding HDMI input connector of the HDMI signal switching device and second HDMI connector for connection to an external source device. The apparatus further comprises a HDMI output connector attached to the bottom panel of the housing and connected to the HDMI output connector of the HDMI signal switching device.

The details of one or more implementations of the invention are set forth in the accompanying drawings and the description below. Other features, aspects and advantages will become apparent from the description, the drawings and the claims.

DETAILED DESCRIPTION OF THE INVENTION

As used herein, the term "utility receptacle" refers to power receptacles, telephone receptacles or jacks, USB device charging ports, audio signal receptacles and connectors, video signal receptacles and connectors, HDMI connectors, computer data receptacles, connectors or data ports, including USB ports.

As used herein, the term "work station" refers to conference tables, work benches, computer tables, desks and similar articles of furniture.

Figure 1:
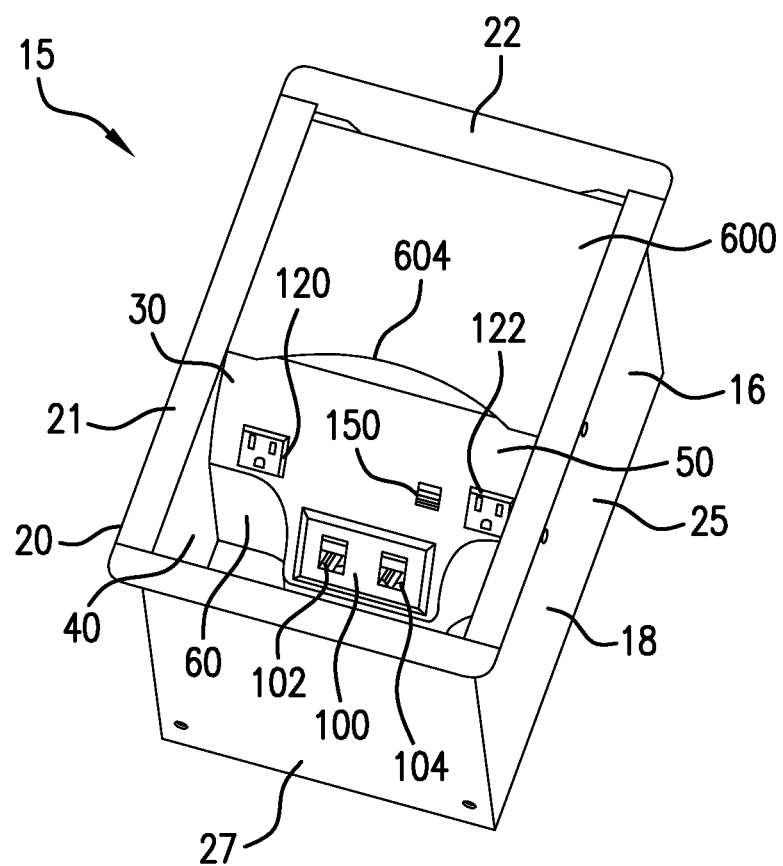
FIG. 1 is a top, perspective view of an apparatus for providing utility receptacles and cables at a selected location on a workstation in accordance with one embodiment of the invention.
Figure 2:
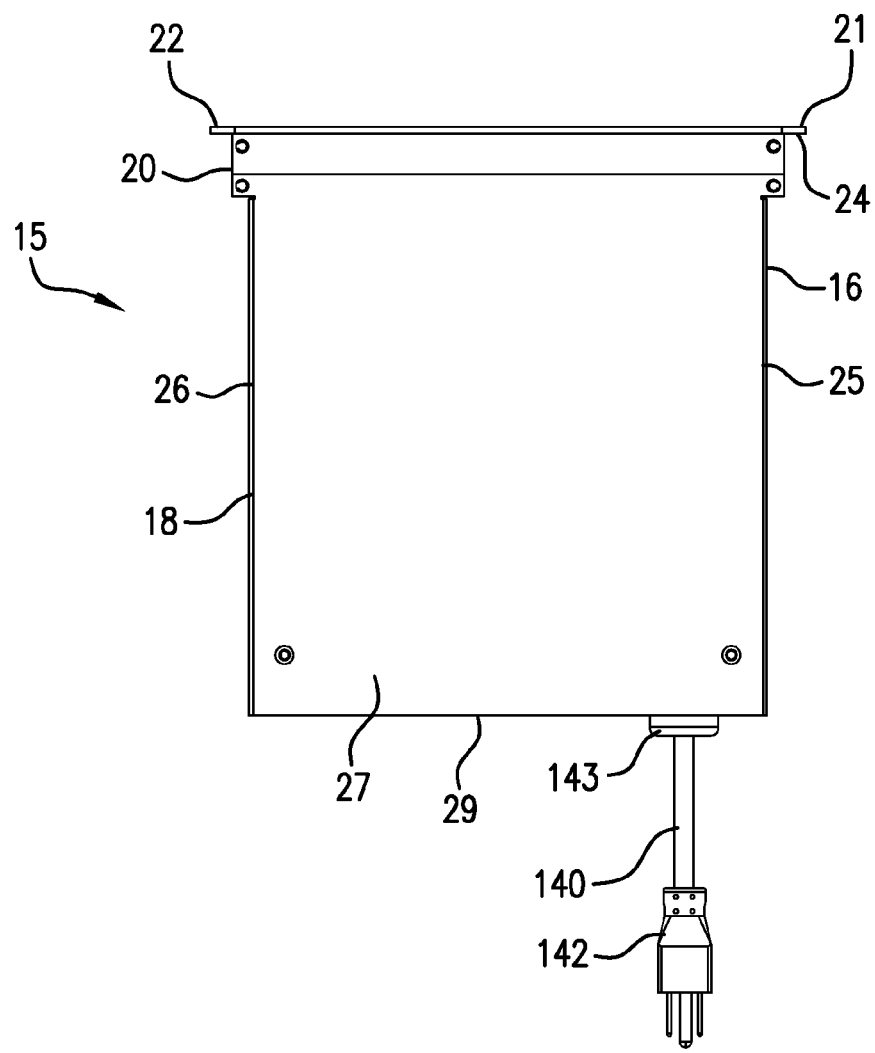
FIG. 2 is a front view thereof.
Figure 3:
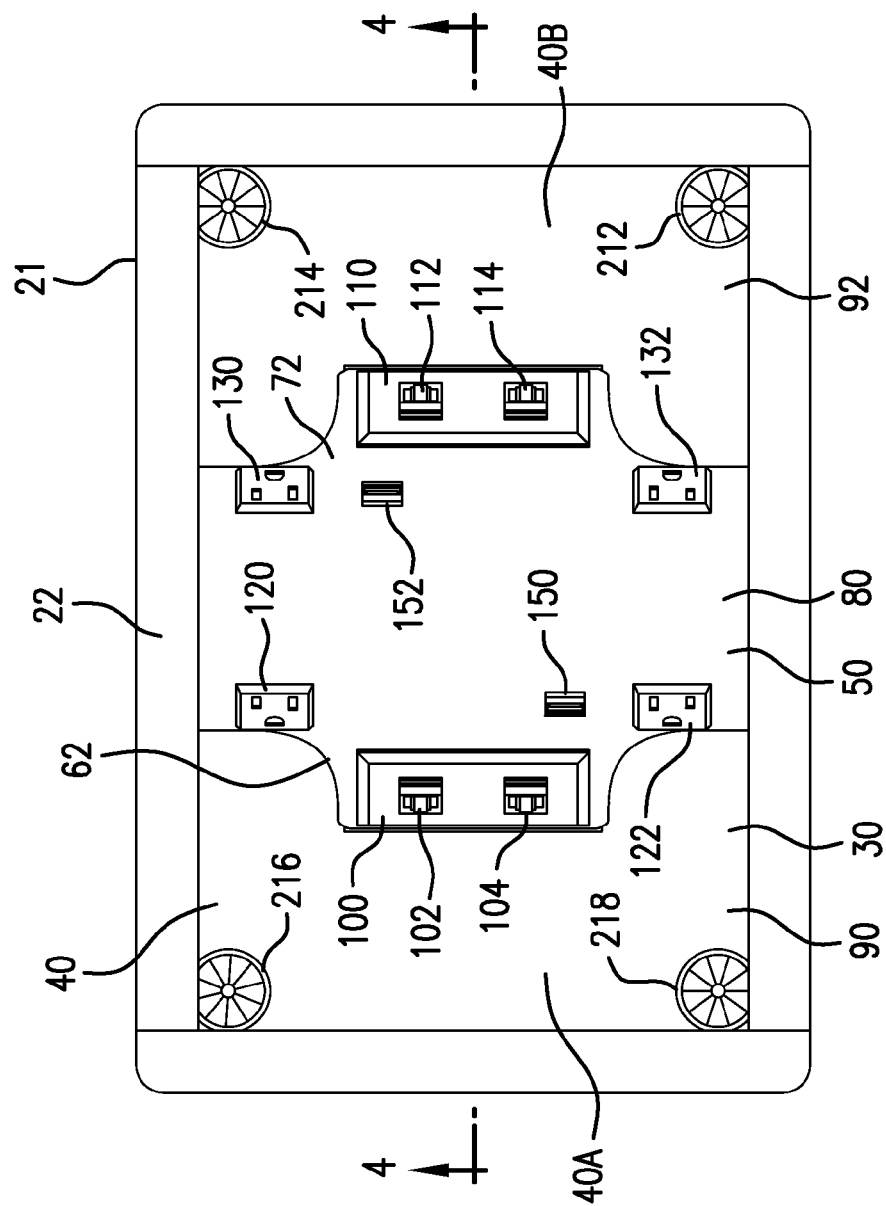
FIG. 3 is a top view thereof, the overlapping cover members not being shown so as to facilitate viewing of a receptacle support structure.
Figure 4:
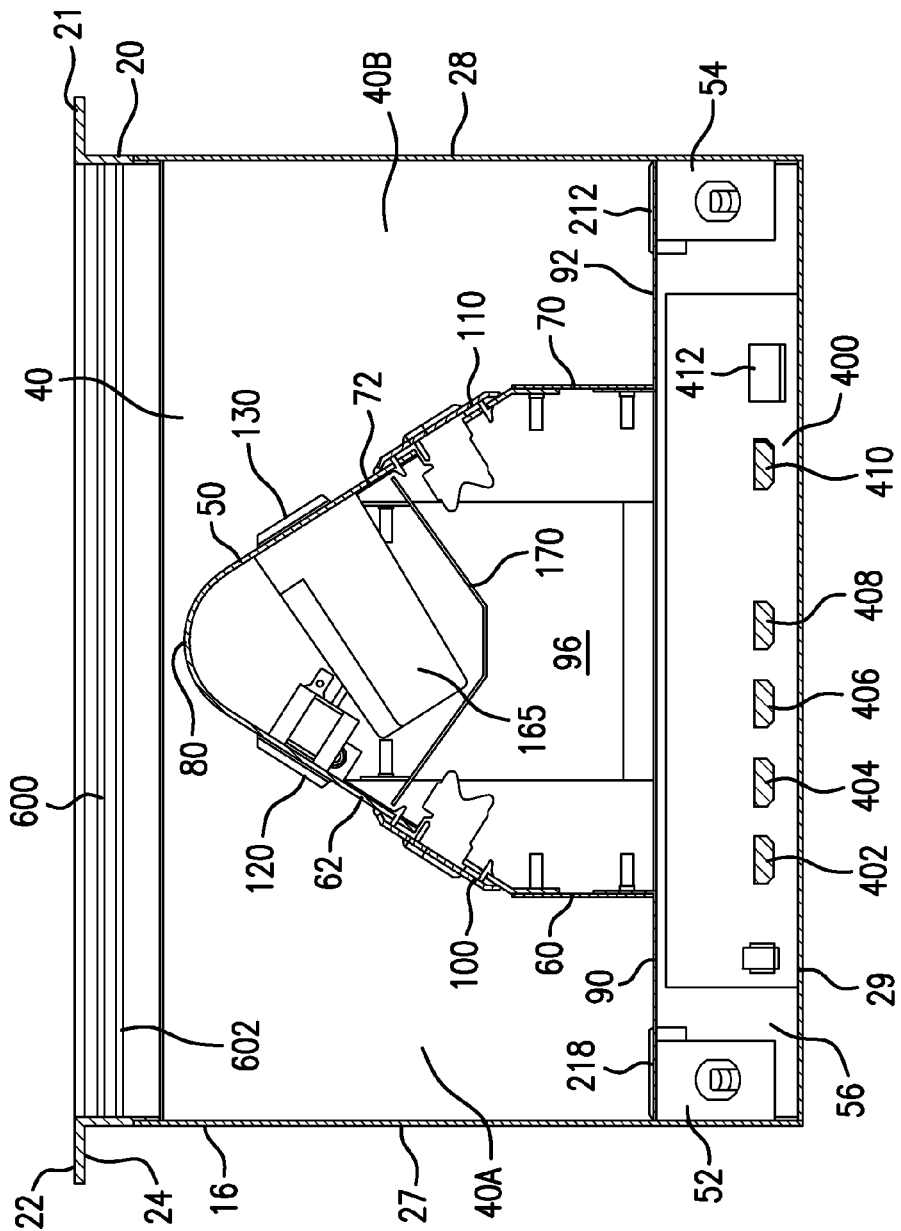
FIG. 4 is a cross-sectional view taken along line 4-4 of FIG. 3.
Figure 5:
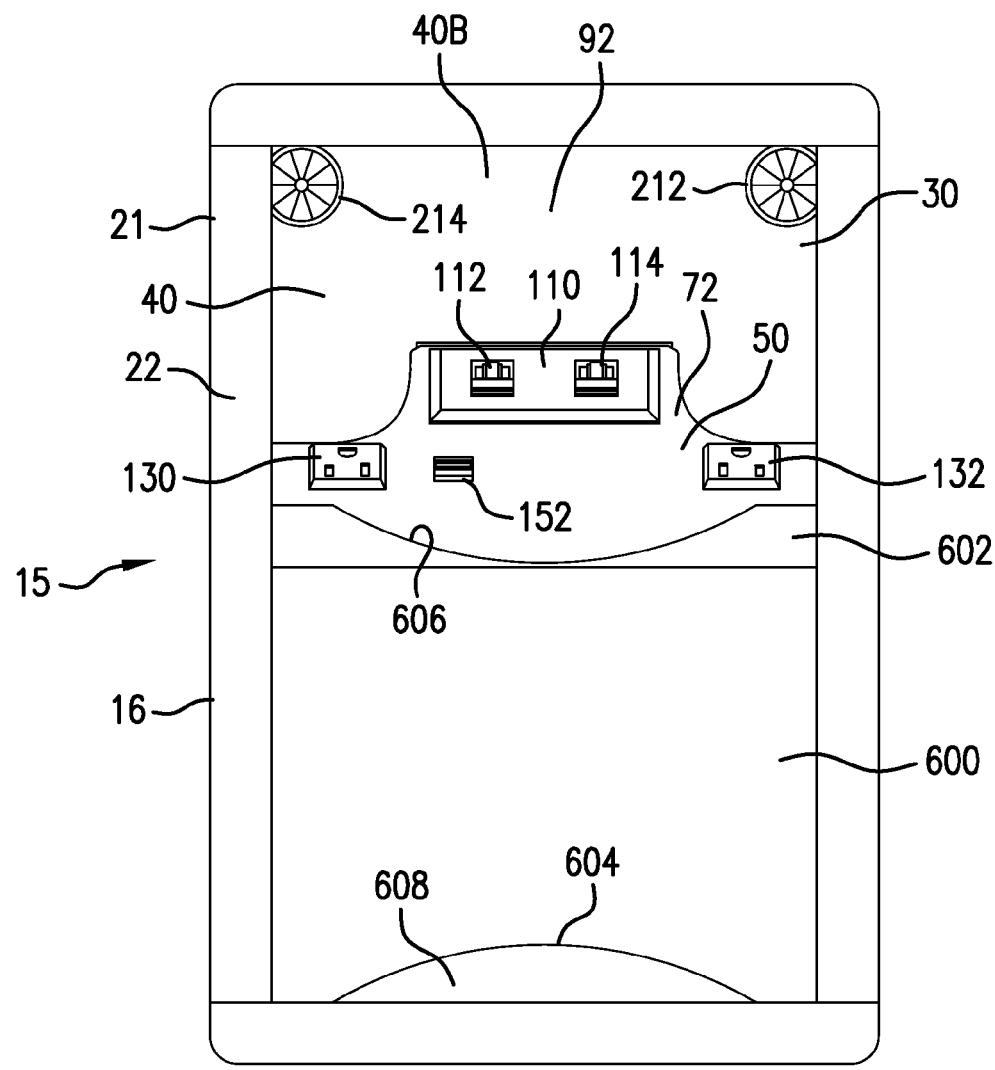
FIG. 5 is a top view thereof, the view showing both overlapping cover members positioned to one side of the apparatus.

Referring to FIGS. 1-4, there is shown apparatus 15 for providing utility receptacles and cables at a selected location on a work station that has a work surface. Apparatus 15 generally comprises housing 16 which comprises lower portion 18 and upper portion 20. Upper portion 20 has flange 21 that extends about the perimeter of upper portion 20. Flange 21 has top side 22 and bottom side 24. Lower portion 18 comprises lengthwise walls 25 and 26, and widthwise walls 27 and 28. Lengthwise walls 25 and 26 and widthwise walls 27 and 28 are attached to and extend downwardly from upper peripheral portion 20. Widthwise wall 27 is attached to lengthwise walls 25 and 26, and widthwise wall 28 is attached to lengthwise walls 25 and 26. Housing 16 includes bottom panel 29 that is attached to lengthwise walls 25 and 26 and widthwise walls 27 and 28. Upper portion 20 includes top opening 30. Top opening 30 is bounded by flange 21. Housing 16 also has interior region 40 that is accessible through top opening 30. Receptacle support structure 50 is located within interior region 40 and attached to support members 52 and 54. Support members 52 and 54 are attached to widthwise walls 27 and 28, respectively. In a preferred embodiment, support members 52 and 54 are also attached to lengthwise walls 25 and 26. As shown in FIG. 4, the size, shape and location of support members 52 and 54 cooperate to form lower compartment 56 under receptacle support member 50.

Receptacle support structure 50 is generally centrally located within interior region 40 and comprises section 60 and section 62. Section 62 is contiguous with and angulated with respect to section 60. Receptacle support structure 50 further comprises section 70 and section 72. Section 72 is contiguous with and angulated with respect to section 70. Receptacle support structure 50 further comprises curved crest section 80 that is contiguous with sections 62 and 72. Receptacle support structure 50 further comprises sections 90 and 92 which are contiguous with sections 60 and 70, respectively. Sections 90 and 92 are both substantially flat. Section 90 is attached to support member 52 and section 92 is attached to support member 54. The central location of receptacle support structure 50 divides interior region 40 into two equal portions or two halves 40A and 40B (see FIG. 6). Receptacle support structure 50 includes an interior 96.

Referring to FIGS. 1, 3, 4 and 5, apparatus 15 further comprises a plurality of utility receptacles that are attached or mounted to receptacle support structure 50. The plurality of utility receptacles comprises AC power receptacles, telephone jacks and USB ports. Specifically, telephone jack module 100 is attached to section 62 of receptacle support structure 50 and comprises telephone jacks 102 and 104. Similarly, telephone jack module 110 is attached to section 72 of receptacle support structure 50 and comprises telephone jacks 112 and 114. Telephone jacks 102, 104, 112 and 114 can be configured as any type of phone jack, including RJ-11, RJ-12, RJ-14, RJ-15, RJ-21X, RJ-25, RJ-31X, and RJ-48C. Each telephone jack 102, 104, 112 and 114 has electrical contacts on the rear thereof and which are positioned in interior 96 of receptacle support structure 50. Wires (not shown) are connected to these electrical contacts and to a telephone network such that each telephone jack 102, 104, 112 and 114 is connected to the telephone network. In an alternate embodiment, telephone jack modules 100 and 110 include Ethernet ports. AC power receptacles 120 and 122 are attached or mounted to section 62 of receptacle support structure 50. AC power receptacles 130 and 132 are attached or mounted to section 72 of receptacle support structure 50. AC power receptacles 120, 122, 130 and 132 are configured to provide a typical AC voltage (e.g. 115-120 VAC) that can be used to power computers, computer peripheral devices, and other equipment. Each AC power receptacle 120, 122, 130 and 132 has electrical contacts on the rear thereof and which are located within interior 96 of receptacle support structure 50. Electrical power cable 140 provides electrically power for the AC power receptacles 120, 122, 130 and 132. Electrical power cable 140 has male plug portion 142 which is configured to be plugged into an AC power receptacle. Electrical power cable 140 extends through strain-relief member 143 and into lower compartment 56.

Apparatus 15 further comprises dual powered USB ports 150 and dual powered USB ports 152. USB ports 150 and 152 are attached or mounted to sections 62 and 72, respectively, of receptacle support structure 50. USB ports 150 and 152 are active USB ports and function as device charging ports for charging or powering devices such as cell phones, Smart Phones, tablets, e-readers, digital recorders, cameras, iPads, iPods, MP3 players, etc. USB ports 150 are electrically connected to USB circuit board 160 (see FIG. 8) which receives 115-120 VAC from electrical power cable 140. USB circuit board 160 comprises a secondary power supply that converts the 115-120 VAC power to 5V DC which is provided at USB ports 150 to power the USB devices such as Smart Phones, iPads, Think Pad, cell phones, etc. USB circuit board 160 is positioned within USB enclosure or cover 165. USB circuit board 160 and USB enclosure 165 are located in interior 96 of receptacle support structure 50. Similarly, USB ports 152 are connected to a USB circuit board (not shown) which is located within a USB enclosure or cover (not shown). The USB circuit board that is connected to USB ports 152 receives electrical power from electrical power cable 140 and comprises a secondary power supply that converts the 115-120 VAC power to 5V DC which is provided at USB ports 152 in order to power the USB devices such as Smart Phones, iPads, Think Pad, cell phones, etc. The USB circuit board that is connected to USB ports 152 is also located within a USB enclosure or cover (not shown) which is located within interior 96 of receptacle support structure 50.

Receptacle support member 50 further comprises a shield or divider member 170 that is located within interior 96 and attached to sections 62 and 72. Shield or divider member 170 separates AC power receptacles 120, 122, 130 and 132 from telephone jacks 102, 104, 112 and 114. Shield or divider member 170 prevents RFI (radio frequency interference) or other EMI (electromagnetic interference) on electrical power cable 140 from being coupled to telephone jacks 102, 104, 112 and 114. Shield or divider member 170 is fabricated from metal.

Figure 6:
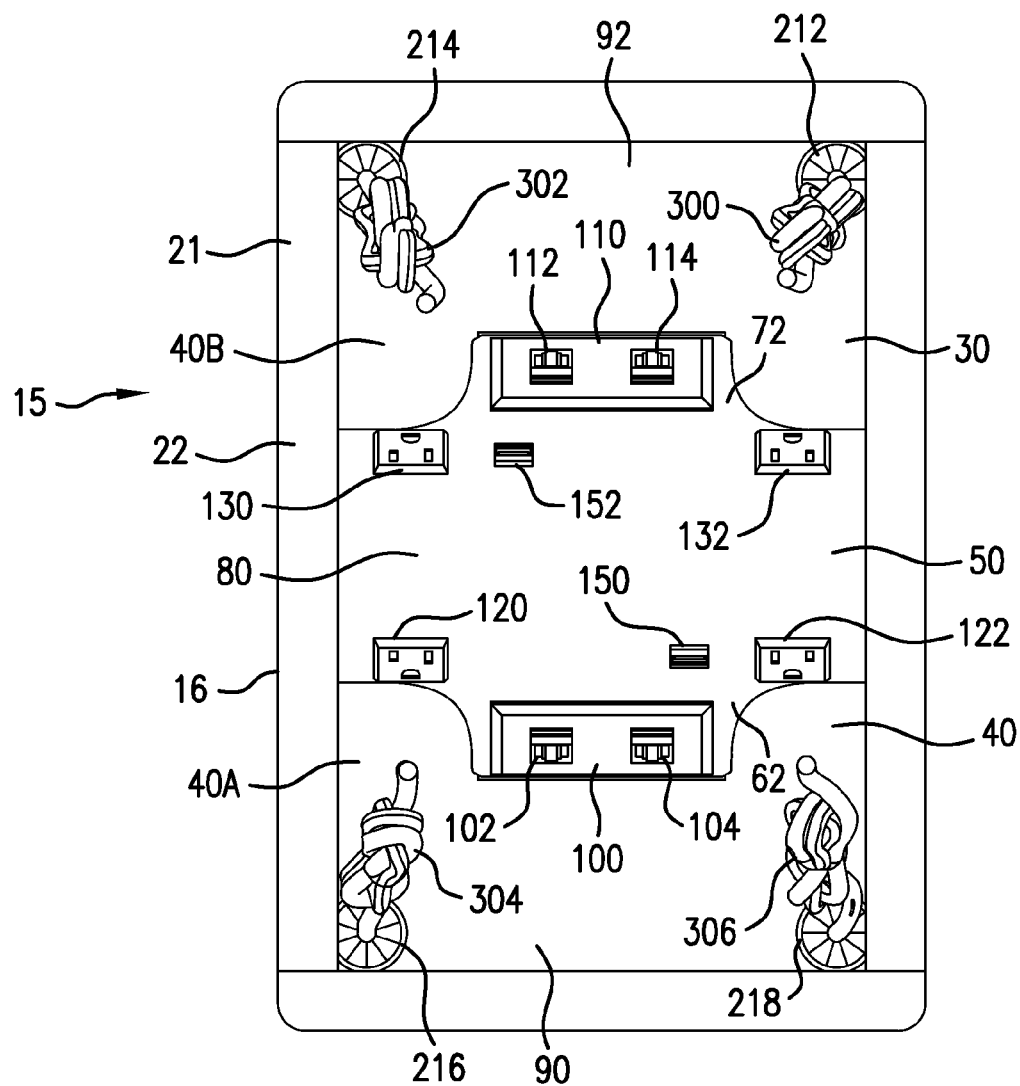
FIG. 6 is a top view thereof, the overlapping cover members not being shown so as to facilitate viewing of cables extending from through-holes in the receptacle support structure.
Figure 7:
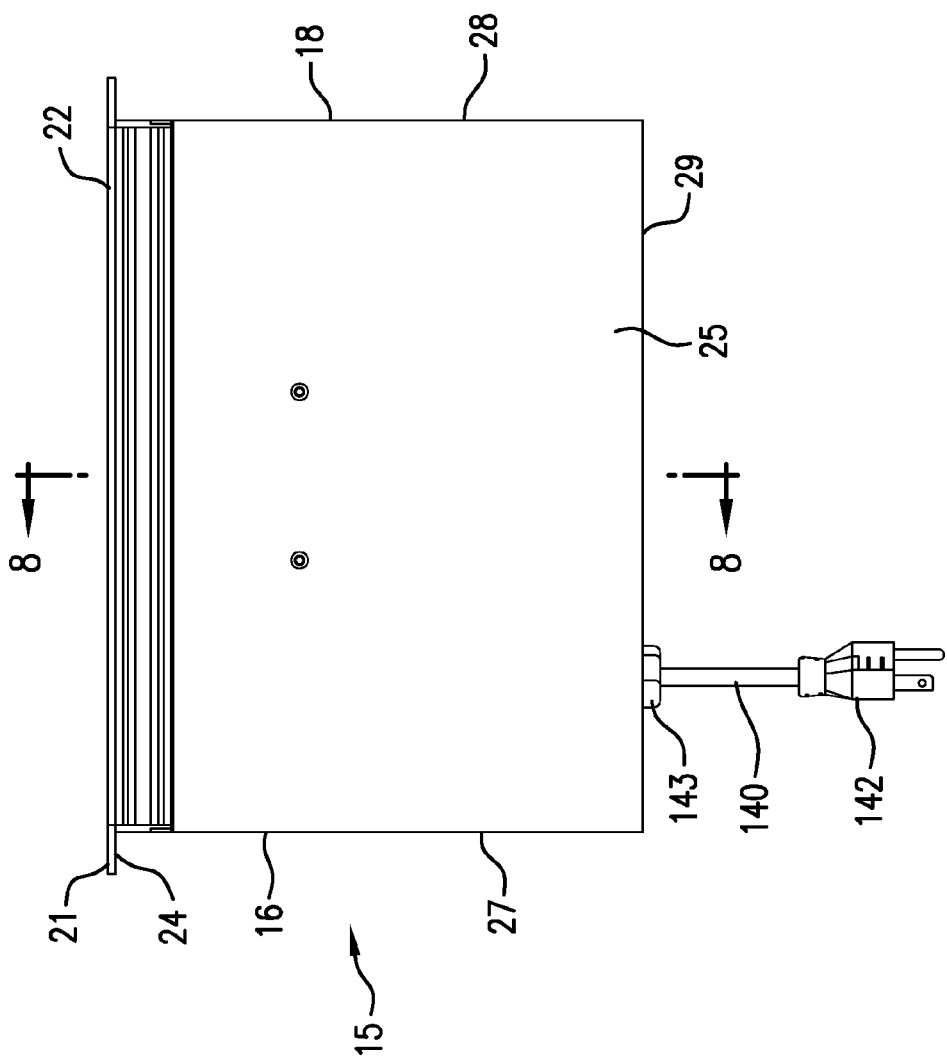
FIG. 7 is a side elevational view thereof.
Figure 10:
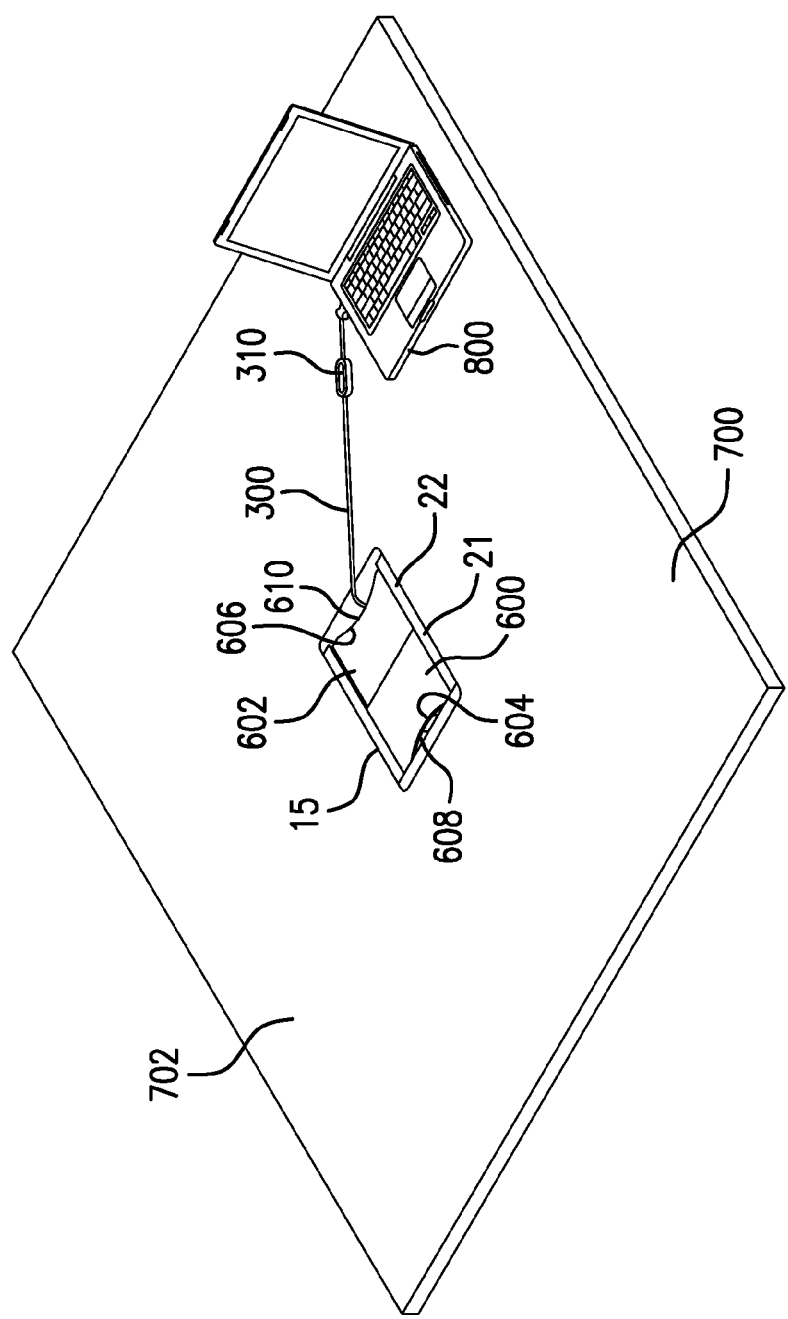
FIG. 10 is a perspective view of the apparatus of the present invention mounted to a workstation.

Referring to FIGS. 3, 4, 5, 6 and 8, sections 90 and 92 of receptacle support structure 50 have through-holes therein which lead to lower compartment 56. The aforementioned through-holes in sections 90 and 92 are located in the corners of interior region 40. Cable grommets 212, 214, 216 and 218 are positioned within the through-holes in sections 90 and 92. Apparatus 15 further comprises a plurality of HDMI cables 300, 302, 304 and 306 which extend through cable grommets 212, 214, 216 and 218, respectively. Each HDMI cable has a first HDMI connector at one end of the cable for connection to a HDMI signal source device such as a notebook, Blue-Ray player, personal computer, DSS receiver, etc. Each HDMI cable includes a second HDMI connector at the opposite end of the cable. The portion of each HDMI cable having the second HDMI connector is located in lower compartment 56. In one embodiment, each HDMI cable 300, 302, 304 and 306 is an Extron "Show Me" cable manufactured by Extron Electronics of Anaheim, Calif. Each cable 300, 302, 304 and 306 has a share button which when pressed, switches a connected HDMI signal source to a main presentation device. For example, as shown in FIG. 10, HDMI cable 300 has share button 310. These features are described in detail in the ensuing description. In FIG. 6, cables 300, 302, 304 and 306 are not in use, so they are shown bundled. Portion 40A of interior region 40 provides sufficient space for storing cables 304 and 306 when these cables are not in use. Similarly, portion 40B of interior region 40 provides sufficient space for storing cables 300 and 302 when these cables are not in use.

Apparatus 15 further comprises HDMI signal switcher device 400 which is located within lower compartment 56. HDMI signal switcher device 400 has HDMI input connectors 402, 404, 406 and 408, HDMI output connector 410 and remote and auto-input switching connector 412. HDMI signal switcher device 400 is powered by the electrical power provided by electrical power cable 140. The second HDMI connector of HDMI cable 300 is connected to HDMI input connector 402. The second HDMI connector of HDMI cable 302 is connected to HDMI input connector 404. The second HDMI connector of HDMI cable 304 is connected to HDMI input connector 406. Similarly, the second HDMI connector of HDMI cable 306 is connected to HDMI connector 408. In one embodiment, HDMI signal switcher device 400 is an Extron SW HDMI Switcher With EDID Minder #60-841-02 manufactured by Extron Electronics of Anaheim, Calif.

Apparatus 15 further comprises an HDMI output connector 500 on bottom side 29. An HDMI cable (not shown) located in lower compartment 56 is connected between HDMI output connector 410 of HDMI signal switcher device 400 and HDMI connector 500. An external HDMI cable (not shown) is connected between HDMI output connector 500 and a main presentation display device (not shown).

Figure 8:
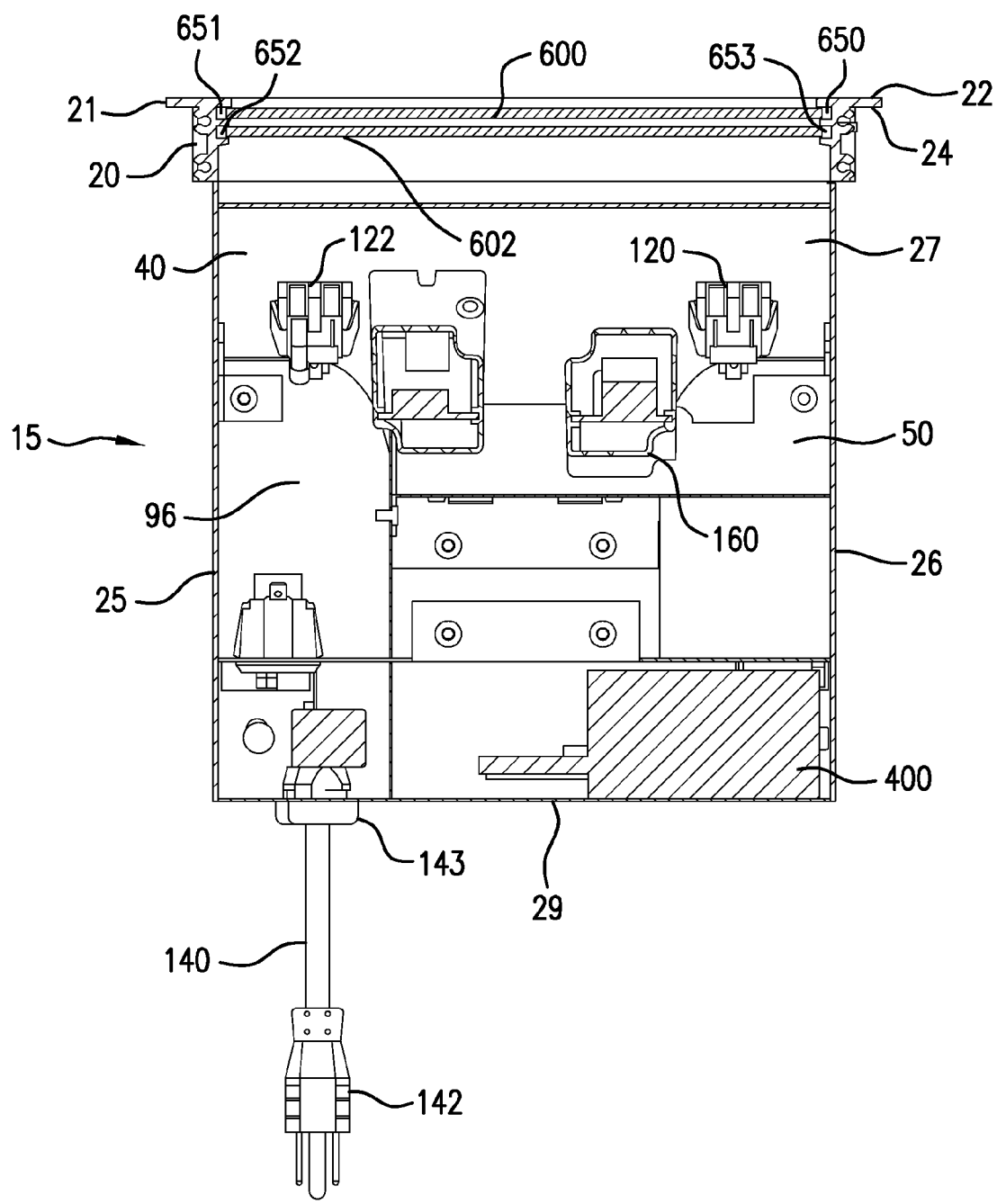
FIG. 8 is cross-sectional view taken along line 8-8 of FIG. 7.
Figure 9:
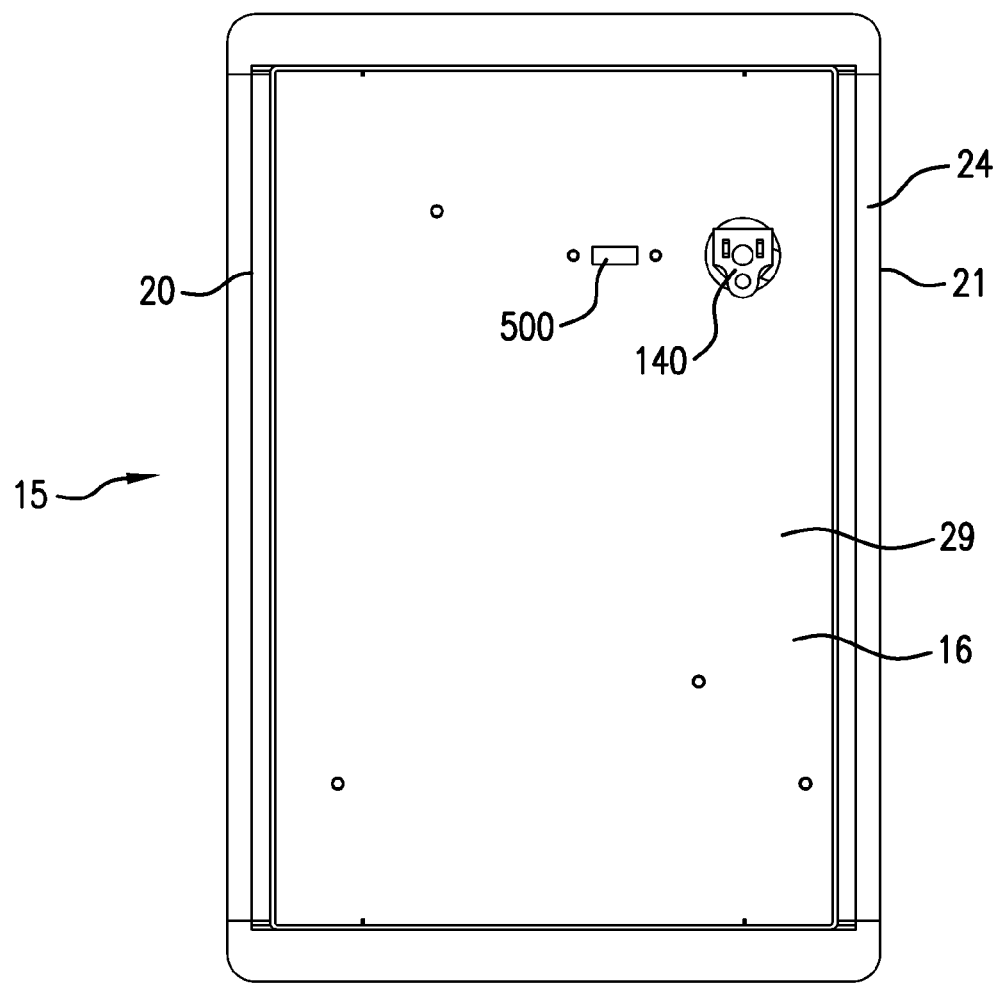
FIG. 9 is a bottom view thereof.

Referring to FIGS. 1, 4, 5, 6, 7, 8 and 10, apparatus 15 further comprises cover members 600 and 602 that are slidably attached to housing 16 and arranged in an overlapping configuration. Cover member 600 is positioned over cover member 602. Cover members 600 and 602 can be arranged to cover either substantially all of receptacle support structure 50, or only one portion of receptacle support structure 50. Thus, only one side of receptacle support structure 50 can be exposed at any one time. Cover members 600 and 602 have curved edges 604 and 606, respectively. Curved edge 604 provides space or gap 608 through which cables can pass. Similarly, curved edge 606 provides space or gap 610 through which cables can pass. Cables or wires can extend through spaces 608 and 610 when both cover members 600 and 602 are arranged to cover both sides of receptacle support structure 50 as shown in FIG. 10. Referring to FIG. 8, upper portion 20 of housing 16 includes tracks 650, 651, 652 and 653 that extend along the length of housing 16. Tracks 650 and 653 are above lengthwise wall 26. Tracks 651 and 652 are above lengthwise wall 25. Track 650 is above track 653. Track 651 is above track 652. Track 650 is aligned with track 651. Cover member 600 slides within tracks 650 and 651. Track 652 is aligned with track 653. Cover member 602 slides within tracks 652 and 653. In one embodiment, covers members 600 and 602 are fabricated from glass. In another embodiment, cover members 600 and 602 are fabricated from plastic. In further embodiment, cover members 600 and 602 are fabricated from metal. In yet another embodiment, cover members 600 and 602 are fabricated from a non-metallic composite material.

Referring to FIG. 10, apparatus 15 is configured to be used with work station 700. Work station 700 has a work surface 702, and a through-hole or opening that extends through the work station 700. The size of the through-hole in work station 702 is sized to allow lower portion 18 of housing 16 to fit therethrough but does not allow flange 21 to fit therethrough. As a result of this configuration, bottom side 24 of flange 21 contacts work surface 702 when apparatus 15 is mounted to work station 700 thereby preventing apparatus 15 from falling through the through-hole in work surface 702. In a preferred embodiment, the through-hole in work station 700 is precisely sized to minimize lateral movement of apparatus 15. HDMI cable 300 extends from interior region 40 through space or gap 610 and is connected to laptop computer 800. Pressing share button 310 creates a momentary contact closure which triggers the HDMI signal switcher device 400 to select the HDMI signals from laptop computer 800 for presentation on the main presentation display.

Figure 11:
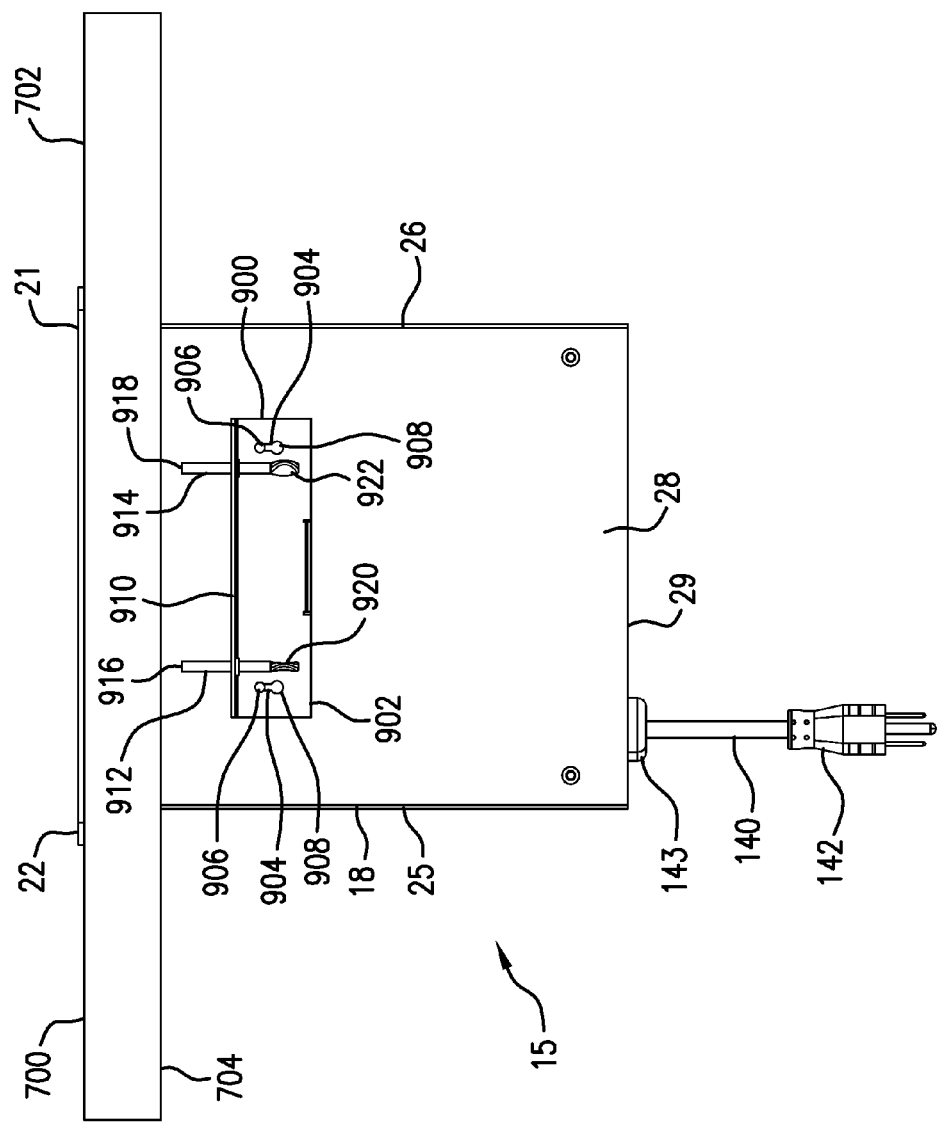
FIG. 11 is rear view thereof, the view showing a clamping system for mounting the apparatus of the present invention to a work station.
Figure 12:
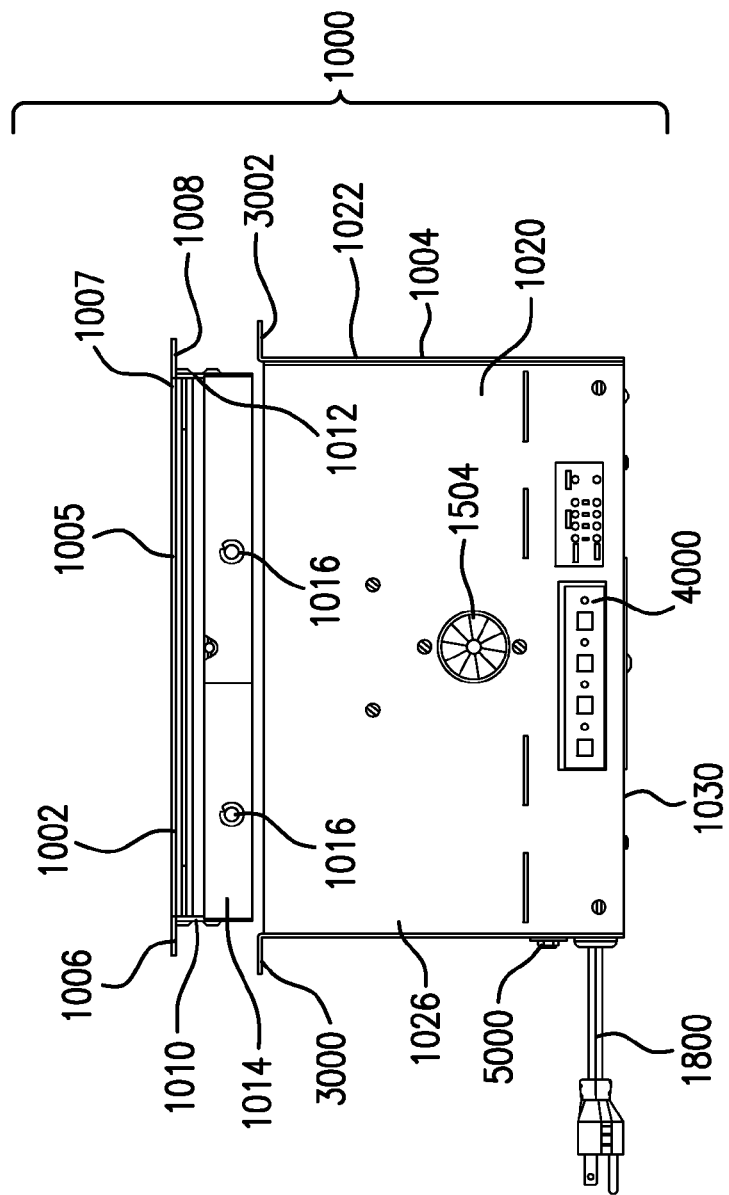
FIG. 12 is an exploded view, in elevation, of an apparatus for providing utility receptacles and cables at a selected location on a workstation in accordance with another embodiment of the invention.
Figure 13:
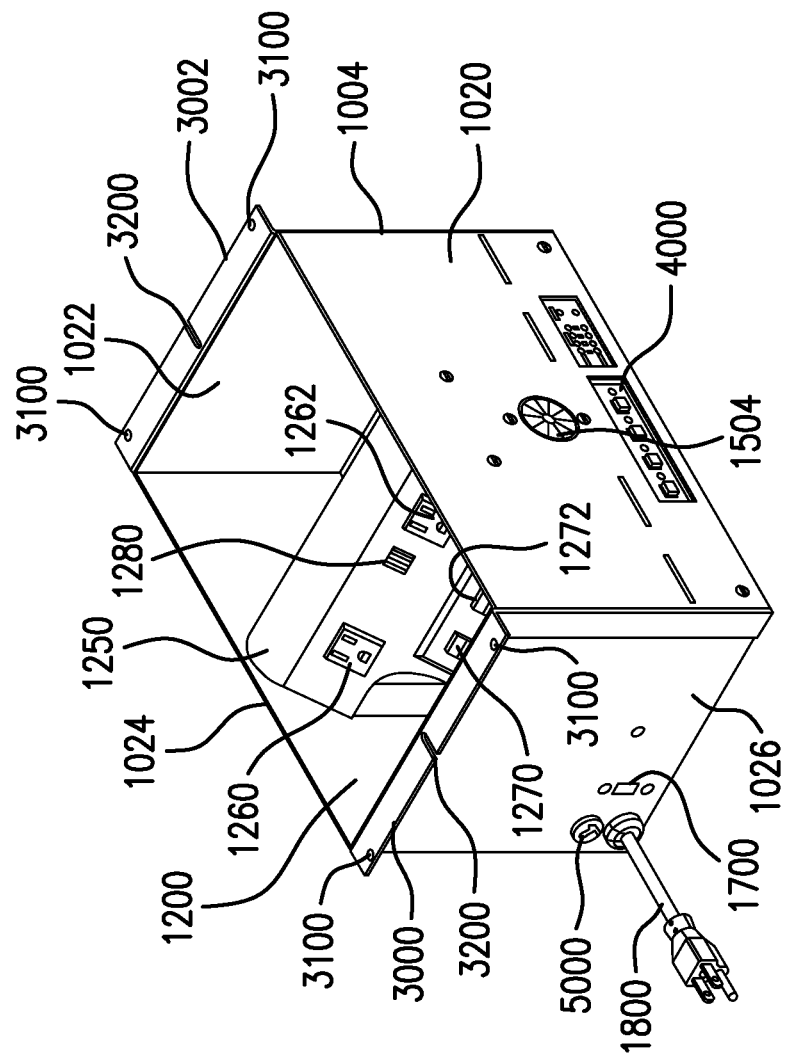
FIG. 13 is a perspective view of a housing section shown in FIG. 12.
Figure 14:
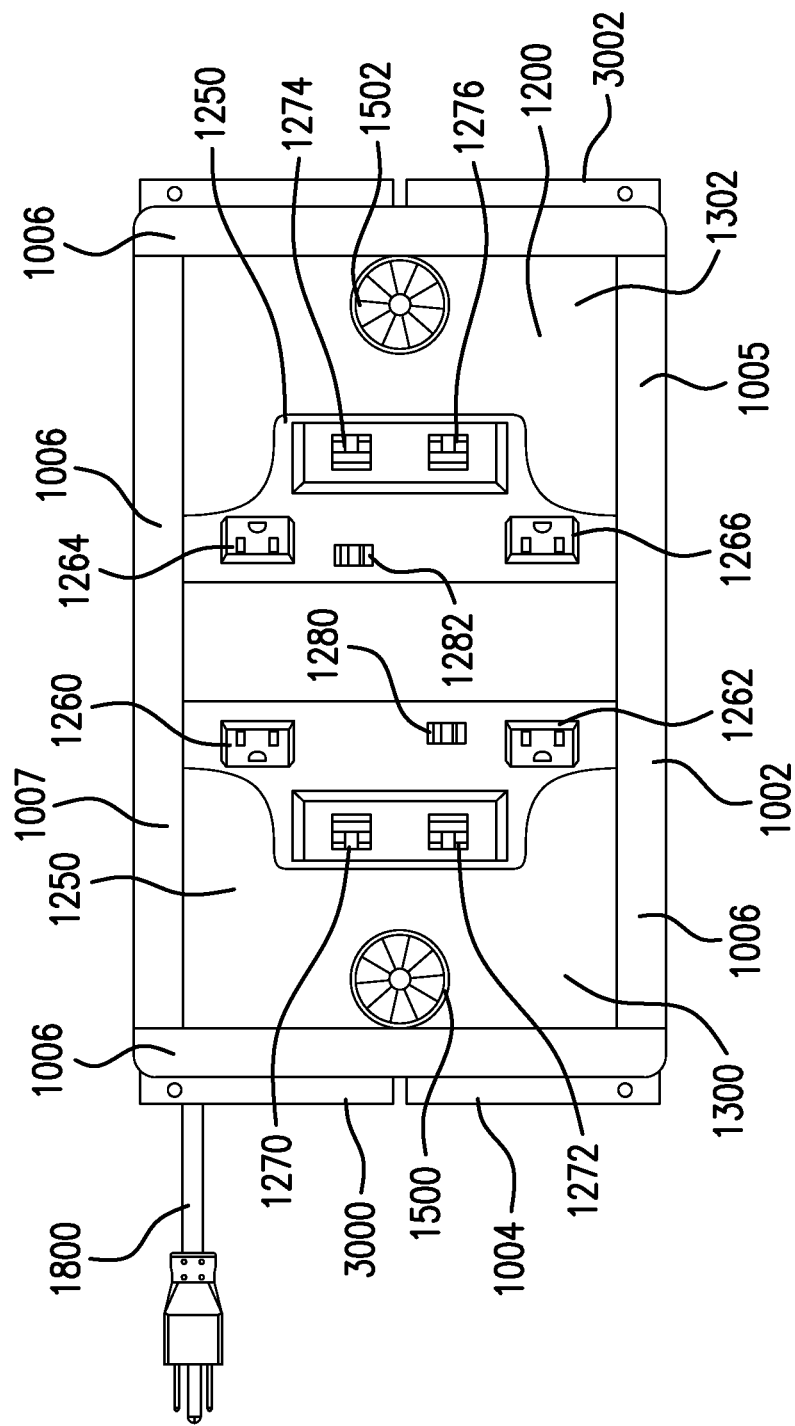
FIG. 14 is a top view of the apparatus of FIG. 12.

Referring to FIG. 11, apparatus 15 further comprises identical clamping systems on widthwise walls 27 and 28 for clamping apparatus 15 to a workstation. One of these clamping systems is indicated by reference number 900. Since these clamping systems are identical, only clamping system 900 is described herein. Clamping system 900 comprises bracket 902 which is attached to widthwise wall 28. Bracket 902 has a pair of slot openings 904. Screws 906 are inserted into slot openings 904 to attach clamp 902 to widthwise wall 28. Each slot opening 904 has a relatively wider portion 908. In order to remove bracket 902 from widthwise wall 28, the user loosens screws 906 and then moves bracket 902 so that portions 908 of slot openings 904 can be passed over the screw heads of screws 906. Bracket 902 has flanged end 910. Locking members 912 and 914 are moveably attached to flanged end 910. In a preferred embodiment, locking members 912 and 914 are threadedly engaged to corresponding threaded openings in bracket 910. Locking member 912 has end 916 and locking member 914 has end 918. Locking members 912 and 914 have flat portions 920 and 922, respectively, which allow a user to turn or rotate locking members 912 and 914. For example, rotating locking members 912 and 914 clockwise will cause ends 916 and 918, respectively, to approach bottom side 704 of workstation 700. When apparatus 15 is mounted to workstation 700, locking members 912 and 914 are tightened against bottom side 704 of workstation 700. When locking members 912 and 914 are tightened, ends 916 and 918 firmly contact bottom side 704 of workstation 700 so as to lock apparatus 15 in place. In a preferred embodiment, each locking member 912 and 914 is configured as a wing screw.

Figure 15:
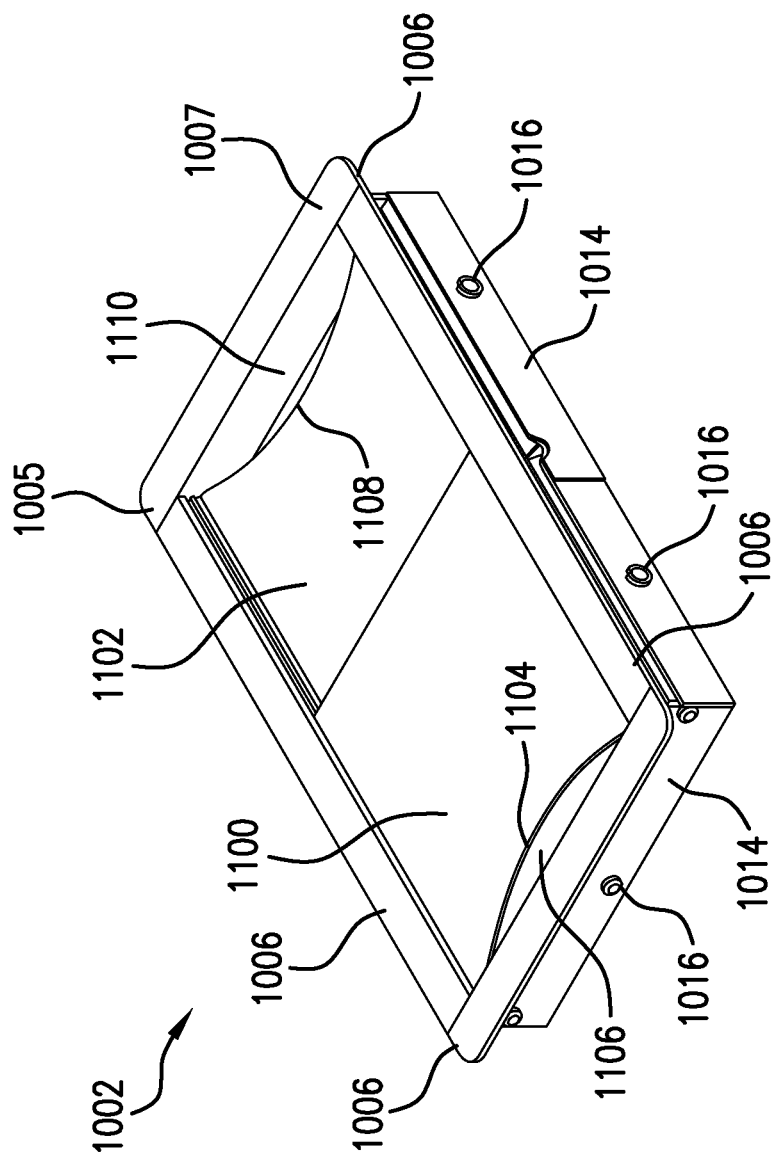
FIG. 15 is a perspective view of a bezel section shown in FIG. 12, the view showing slide doors in a closed position.
Figure 16:
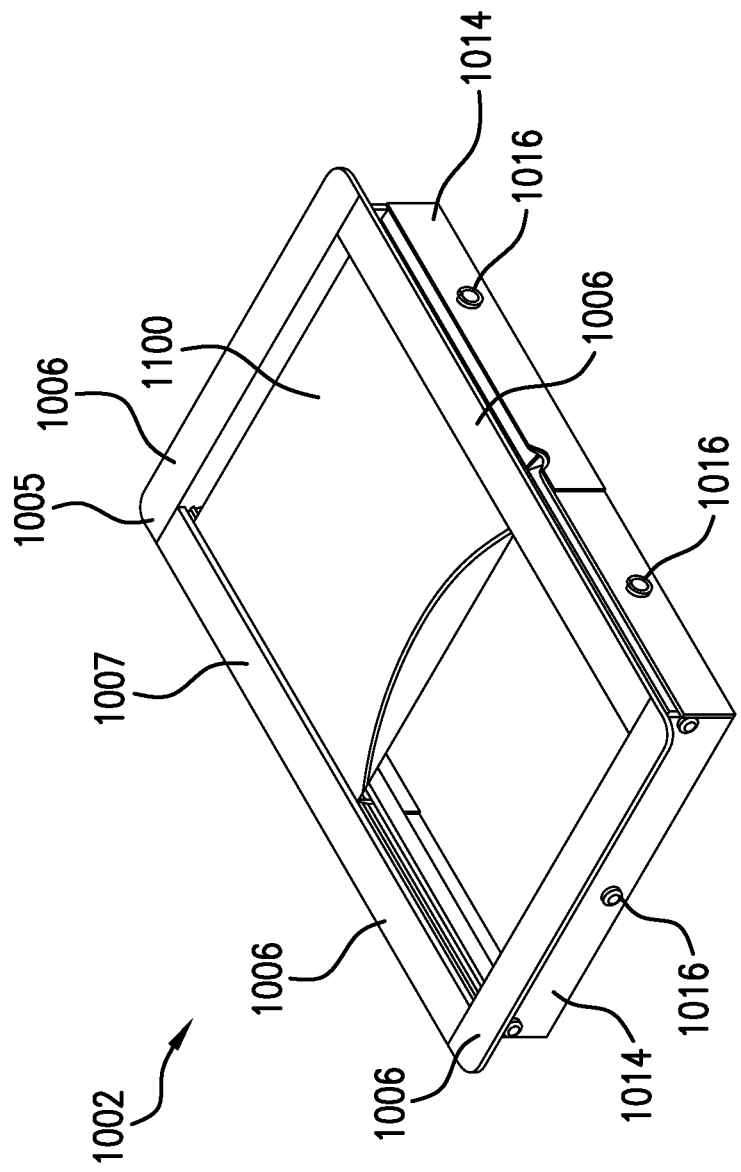
FIG. 16 is a perspective view of the bezel, the view showing both slide doors positioned at one side of the bezel section.

Referring to FIGS. 12-20, there is shown apparatus 1000 for providing utility receptacles and cables at a selected location on a work station in accordance with another embodiment of the present invention. In this embodiment, apparatus 1000 comprises bezel section 1002 and housing section 1004. Bezel section 1002 and housing section 1004 are separate components. As shown in FIGS. 15 and 16, bezel section 1002 comprises frame 1005 which comprises flange portion 1006. Flange portion 1006 has top side 1007 and bottom side 1008. Bezel section 1002 further comprises wall sections 1010 and 1012 that are attached to and extend from bottom side 1008 of flange portion 1006. Bezel section 1002 further comprises skirt 1014 that is removably attached to wall sections 1010 and 1012. Bezel section 1002 is configured to be removably mounted to work station 2000 (see FIGS. 17 and 18). Work station 2000 has work surface 2002 and bottom side 2004. The work station 2000 has a through-hole 2006, shown in phantom in FIG. 17, which extends through work station 2000. The size of through-hole 2006 is sized to allow wall sections 1010, 1012 and skirt 1014 to fit therethrough but does not allow flange portion 1006 to fit therethrough. When bezel section 1002 is completely mounted to work station 2000, skirt 1014 and wall sections 1010 and 1012 are fitted through through-hole 2006 and bottom side 1008 of flange portion 1006 contacts work surface 2002 of work station 2000. Skirt 1014 is removably attached to wall sections 1010 and 1012. If work station 2000 is relatively thick, then skirt 1014 provides additional stability and makes firm contact with the inner edges of through-hole 2006 in work station 2000. In one embodiment, skirt 1014 has a plurality of openings 1016 for receiving fasteners or screws (not shown) that are used to attach skirt 1014 to the portions of work station 2000 that extend about the through-hole 2006. If work station 2000 is relatively thin, skirt 1014 may be removed from bezel 1002 prior to mounting bezel 1002 to work station 2000. In one embodiment, wall sections 1010 and 1012 also have openings (not shown) to receive fasteners or screws (not shown) that are used to attach wall sections 1010 and 1012 to the portions of work station 2000 that extend about through-hole 2006. As shown in FIGS. 15 and 16, bezel section 1002 further comprises slide doors 1100 and 1102 that are slidably attached to frame 1005 and arranged in an overlapping configuration. Slide door 1100 is positioned over slide door 1102 and function generally in the same manner as cover members 600 and 602 that were described in the foregoing description. Slide door 1100 has a curve 1104 that provides a space 1106 when slide doors 1100 and 1102 are both closed. Space 1106 is sized to allow cables to extend therethrough. Similarly, slide door 1102 has a curve 1108 that provides a space 1110 when slide doors 1100 and 1102 are closed. Space 1110 is sized to allow cables to extend therethrough.

Referring to FIGS. 12-14 and 19-20, housing section 1004 generally has the same configuration as lower portion 18 of housing 16 (see FIGS. 1-4). Housing section 1004 has wall sections 1020, 1022, 1024 and 1026, and a bottom panel 1030. Housing section 1004 further comprises interior 1200 and receptacle support structure 1250 that is generally centrally located within interior 1200. Receptacle support structure 1250 includes a plurality of utility of receptacles such as AC power receptacles 1260, 1262, 1264 and 1266, telephone jacks 1270, 1272, 1274 and 1276, and USB ports 1280 and 1282. The functions of such utility receptacles were described in the foregoing description of apparatus 15. Receptacle support structure 1250 has generally the same shape and provides the same function as receptacle support structure 50 shown in FIG. 3. Furthermore, receptacle support structure 1250 has substantially the same configuration and electrical circuitry as receptacle support structure 50. Receptacle support structure 1250 includes substantially flat sections 1300 and 1302. Housing section 1004 includes lower compartment 1325 that is similar to lower compartment 56 of apparatus 15. Flat section 1300 has a through-hole and cable grommet 1500 positioned therein. Similarly, flat section 1302 has a through-hole and cable grommet 1502 positioned therein. Each cable grommet 1500 and 1502 is configured to receive a corresponding HDMI cable (not shown) and has the same structure and function as any of the cable grommets 212, 214, 216 and 218 of apparatus 15. Housing section 1004 further includes cable grommets 1504 positioned in a through-hole in wall section 1020 and another cable grommet 1506 positioned in another through-hole in wall section 1024. Cable grommets 1504 and 1506 receive telephone cables that are to be connected to telephone jacks 1270, 1272, 1274 and 1276. In a preferred embodiment, each HDMI cable used with apparatus 1000 is an Extron "Show Me" cable which was described in the foregoing description of apparatus 15 (e.g. cable 300). Apparatus 1000 includes an HDMI signal switcher device 4000 positioned in lower compartment 1325 which has the same function and configuration as HDMI signal switcher device 400 previously described herein. Each HDMI cable (not shown) has a first connector at one end that is connected to a corresponding input of the HDMI signal switcher device 4000. Each HDMI cable extends through a corresponding one of cable grommets 1500 and 1502. Each HDMI cable has a second connector at the opposite end that is configured to be connected to an HDMI port of an external audio/video device (not shown). Apparatus 1000 includes HDMI output connector 1700 that is connected to the output of the HDMI signal switcher device 4000. An external HDMI cable (not shown) is connected to HDMI output connector 1700 and a main presentation display device (not shown).

Referring to FIGS. 13, 14, 17 and 18, housing section 1004 includes flanges 3000 and 3002. Flanges 3000 and 3002 have through-holes 3100 and slots 3200 that are sized to receive fasteners (e.g. screws) 3300 that are used to attach housing section 1004 to bottom side 2004 of work station 2000. Power cord 1800 provides electrical power to the AC receptacles 1260, 1262, 1264 and 1266, electrical circuitry, USB circuit boards and the HDMI signal switcher device 4000.

Figure 17:
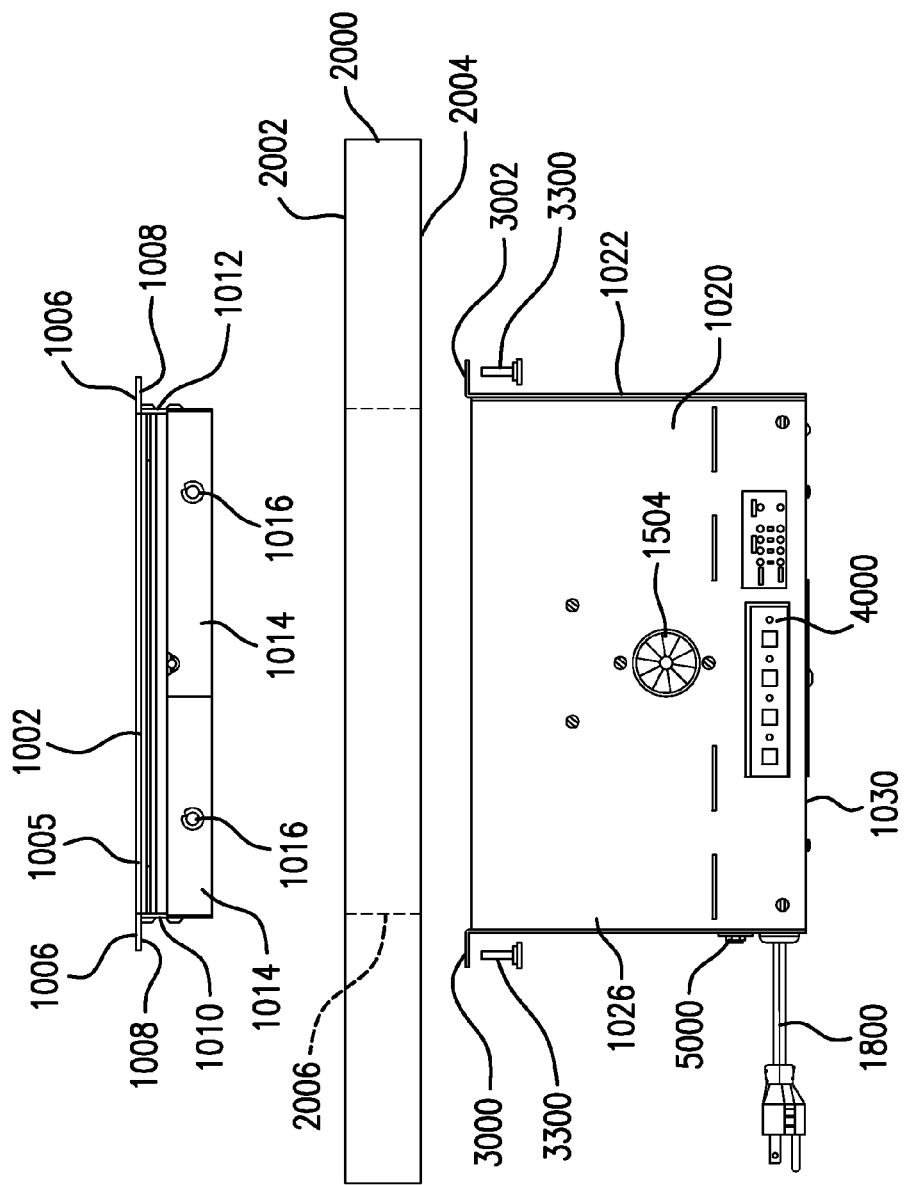
FIG. 17 is an exploded view showing how the apparatus of FIG. 12 removably mounted to a work station.
Figure 18:
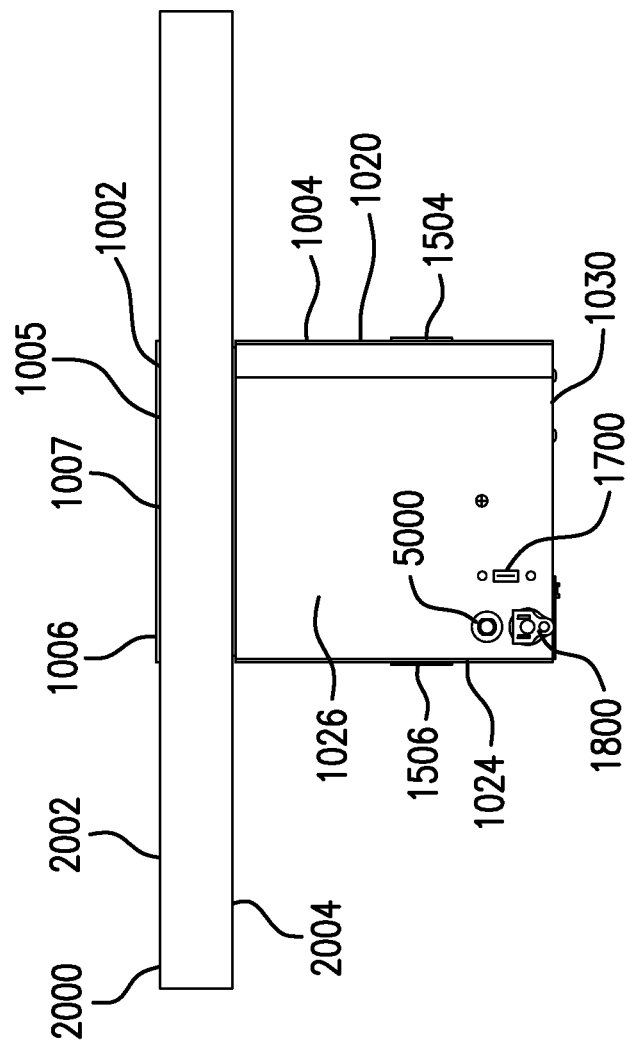
FIG. 18 is a side view, in elevation, showing the apparatus of FIG. 12 completely mounted to the work station.
Figure 19:
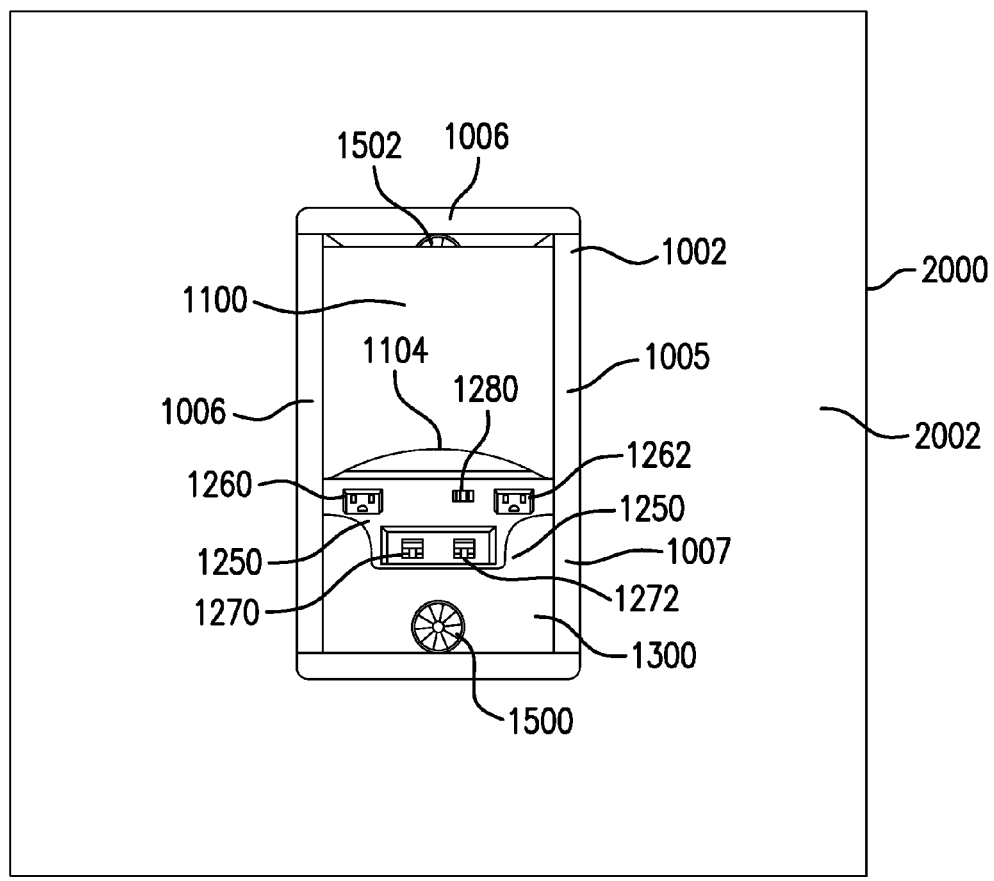
FIG. 19 is a top view of the apparatus mounted to the work station, the view showing the slide doors being positioned at one side of the bezel section.
Figure 20:
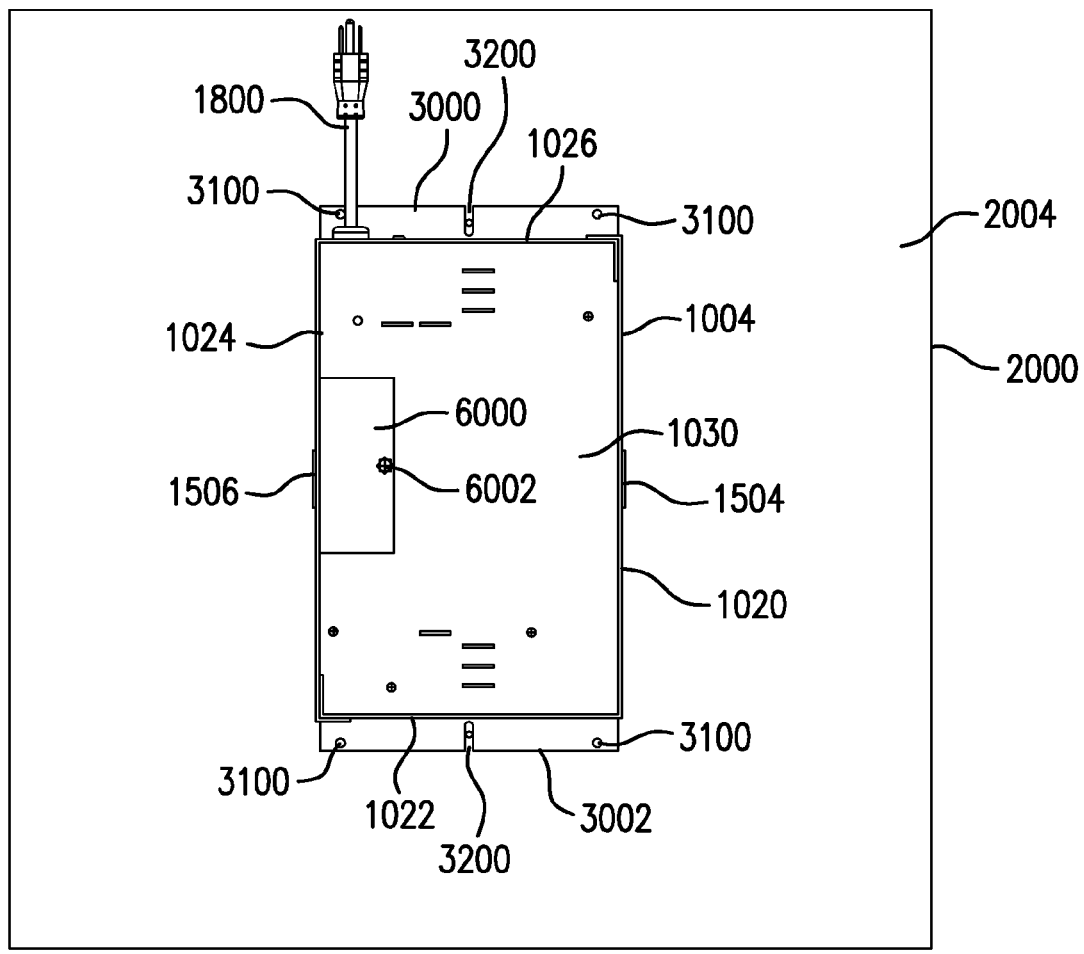
FIG. 20 is a bottom view of the apparatus mounted to the work station.
Figure 21:
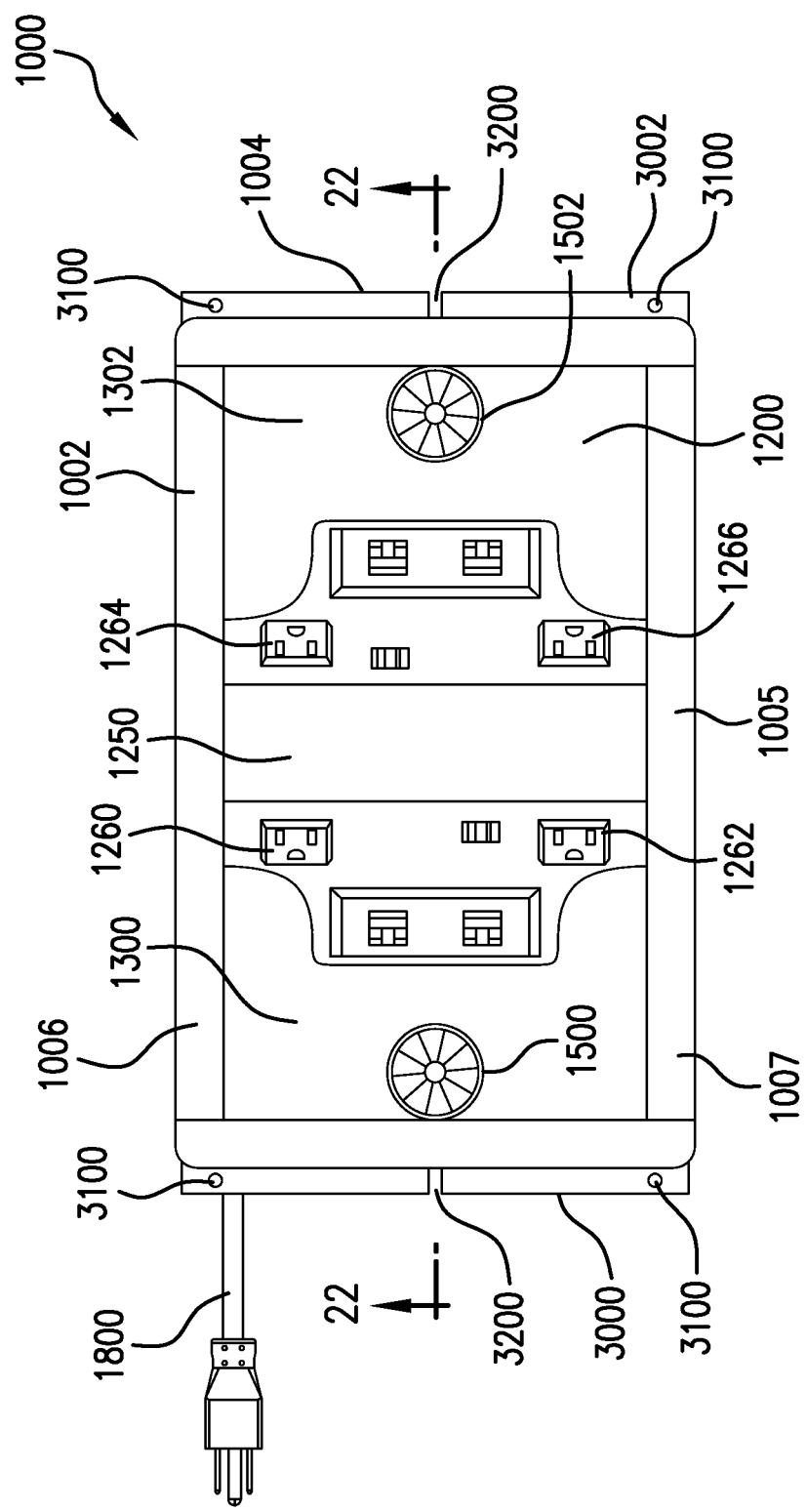
FIG. 21 is a top view of the apparatus of FIG. 12.
Figure 22:
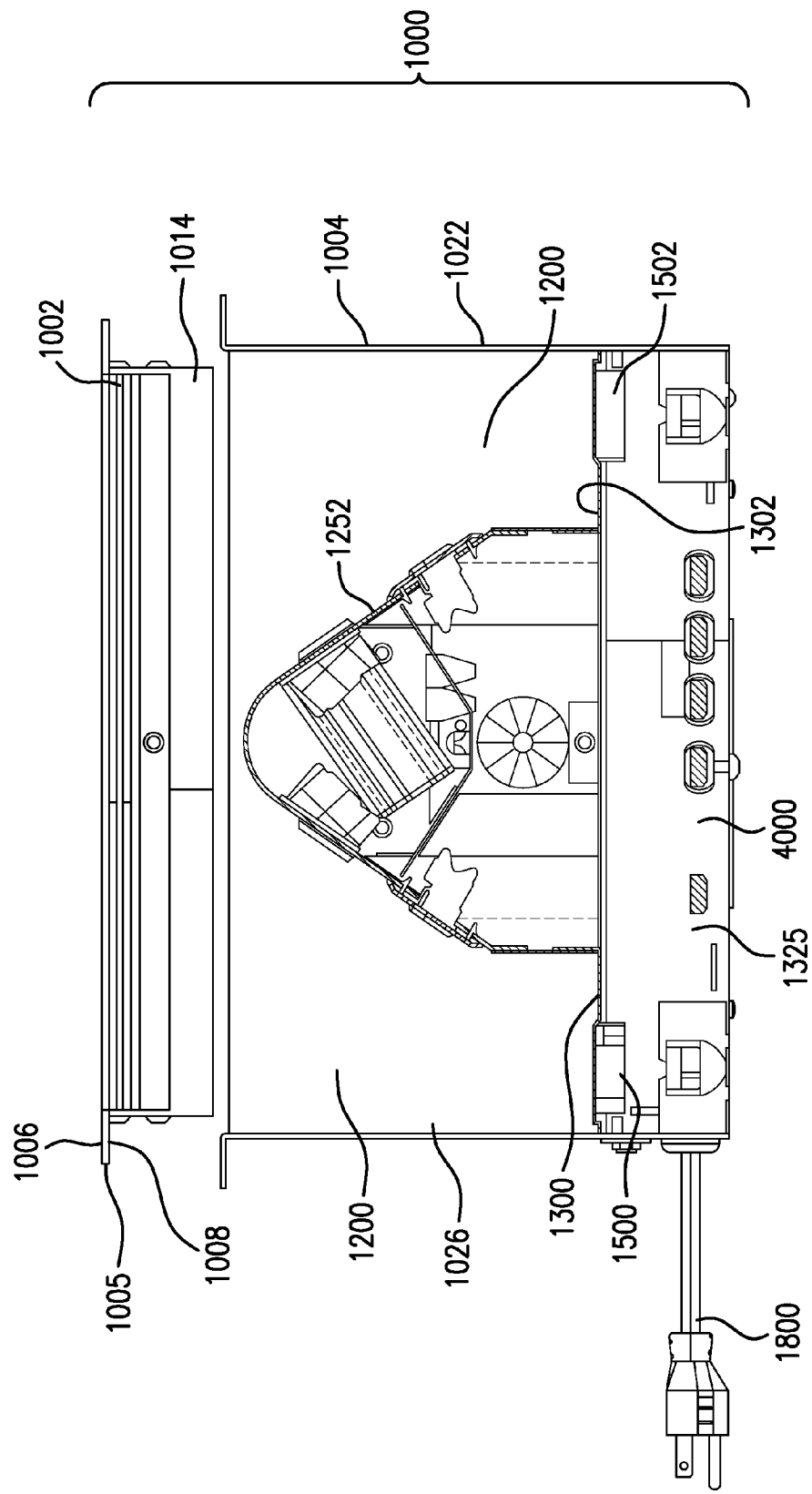
FIG. 22 is a cross-sectional view taken along line 22-22 of FIG. 21.

Referring to FIGS. 17, 18 and 20, apparatus 1000 includes circuit breaker 5000 and door 6000 in bottom panel 1030. Door 6000 is removably attached to bottom panel 1030 via screw 6002 and provides access to the electrical power plug of the HDMI signal switcher device 4000 in lower compartment 1325 in the event the HDMI signal switcher device 4000 must be disconnected during testing or reboot.

It is to be understood that the quantity and type of utility receptacles used in apparatus 15 and apparatus 1000 can be varied and that the utility receptacles described in the foregoing description are examples. Portions of apparatus 15 and apparatus 1000 can be fabricated from metals such as aluminum, stainless steel, steel, etc. Other suitable materials may be used.

The principles, preferred embodiments and modes of operation of the present invention have been described in the foregoing specification. The invention which is intended to be protected herein should not, however, be construed as limited to the particular forms disclosed, as these are to be regarded as illustrative rather than restrictive. Variations and changes may be made by those skilled in the art without departing from the spirit of the invention. Accordingly, the foregoing detailed description should be considered as exemplary in nature and not as limiting the scope and spirit of the invention as set forth in the attached claims.

What is claimed is:

1. An apparatus for providing utility receptacles and cables at a selected location on a work station that has a work surface, comprising:

a housing comprising a lower portion and an upper portion, the upper portion having a perimeter and a flange portion that extends about the entire perimeter, the upper portion of the housing having a top opening that is bounded by the flange portion, the lower portion of the housing comprising lengthwise and widthwise walls that are attached to and extend downwardly from the upper portion of the housing, the housing further comprising a bottom panel that is attached to the lengthwise and widthwise walls, the housing having an interior region that is accessible through top opening;

wherein the housing is sized so that the lower portion fits into a through-hole in a work surface of a work station and the flange portion contacts and rests upon portions of the work surface that extend about the through-hole in the work surface;

a receptacle support structure located within the interior region and attached to the lower portion of the housing at a predetermined location above the bottom panel so as to form a lower compartment beneath the receptacle support structure, the receptacle support structure being generally centrally located within the interior region and further including an interior, the receptacle support structure further including a plurality of through-holes leading to the lower compartment;

a plurality of utility receptacles that are attached to the receptacle support structure, the plurality of utility receptacles comprising AC power receptacles and telephone jacks, all of which having electrical contacts that are located in the interior of the receptacle support structure;

a HDMI signal switching device located within the lower compartment and comprising a plurality of HDMI input connectors and a HDMI output connector;

a plurality of HDMI cables, wherein each cable extends from a corresponding through-hole in the receptacle support structure and has a first HDMI connector connected to a corresponding HDMI input connector of the HDMI signal switching device and second HDMI connector for connection to an external source device; and a HDMI output connector attached to the bottom panel of the housing and connected to the HDMI output connector of the HDMI signal switching device.

2. The apparatus according to claim 1 further comprising a pair of cover members slidably attached to housing and arranged in an overlapping configuration such that only one half of the receptacle support structure can be exposed at any time.

3. The apparatus according to claim 2 wherein each cover member has a curved edge that provides a gap when the cover members are in the closed position, wherein the HDMI cables extend through the gap.

4. The apparatus according to claim 1 further comprising an electrical power cable electrically connected to the AC power receptacles, the electrical power cable having a male plug portion configured to be plugged into an AC power receptacle.

5. The apparatus according to claim 1 further comprising a shield located within the interior of and attached to the receptacle support structure for shielding the telephone jacks from RFI and EMI.

6. The apparatus according to claim 1 wherein each HDMI cable includes a switch that, when pressed, triggers the HDMI switching device to connect the source device connected to the HDMI cable to a main presentation device.

7. The apparatus according to claim 1 further comprising at least one USB charging port on the receptacle support structure for providing power for charging USB devices.

8. The apparatus according to claim 7 further comprising a device electrically connected to the USB charging port for converting a first electrical voltage at a first electrical current to a second voltage at a second electrical current, wherein the second electrical voltage and second electrical current is less than the first electrical voltage and the first electrical current, respectively, and wherein the second electrical voltage and second electrical current is provided at the USB charging port.

9. The apparatus according to claim 1 further comprising means for attaching the apparatus to a work surface.

* * * * *